(12) United States Patent
Palacios Laloy et al.

(10) Patent No.: US 11,644,355 B2
(45) Date of Patent: May 9, 2023

(54) MASS FLOW RATE MEASUREMENT DEVICE

(71) Applicants: COMMISSARIAT A L'ENERGIE ATOMIQUE ET AUX ENERGIES ALTERNATIVES, Paris (FR); SAFRAN, Paris (FR)

(72) Inventors: Agustin Palacios Laloy, Grenoble (FR); Jean-Christophe Riou, Boulogne Billancourt (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 130 days.

(21) Appl. No.: 17/275,072

(22) PCT Filed: Sep. 3, 2019

(86) PCT No.: PCT/EP2019/073458
§ 371 (c)(1),
(2) Date: Mar. 10, 2021

(87) PCT Pub. No.: WO2020/053033
PCT Pub. Date: Mar. 19, 2020

(65) Prior Publication Data
US 2021/0255012 A1   Aug. 19, 2021

(30) Foreign Application Priority Data

Sep. 13, 2018 (FR) .................................. FR1871032

(51) Int. Cl.
*G01F 1/84* (2006.01)

(52) U.S. Cl.
CPC .......... *G01F 1/8436* (2013.01); *G01F 1/8422* (2013.01); *G01F 1/8427* (2013.01); *G01F 1/8431* (2013.01); *G01F 1/8472* (2013.01)

(58) Field of Classification Search
CPC .... G01F 1/8413; G01F 1/8422; G01F 1/8427; G01F 1/8459; G01F 1/8463
See application file for complete search history.

(56) References Cited

U.S. PATENT DOCUMENTS

| 5,373,745 A | 12/1994 | Cage |
| 6,907,792 B2 * | 6/2005 | Ohnishi .................... G01F 1/66 73/861.27 |

(Continued)

FOREIGN PATENT DOCUMENTS

| DE | 43 27 052 A1 | 2/1995 |
| JP | 6-50784 A | 2/1994 |

(Continued)

OTHER PUBLICATIONS

International Search Report dated Nov. 27, 2019 in PCT/EP2019/073458 filed Sep. 3, 2019, citing documents AA-AE and AO-AT therein, 3 pages.

*Primary Examiner* — Erika J. Villaluna
(74) *Attorney, Agent, or Firm* — Oblon, McClelland, Maier & Neustadt, L.L.P.

(57) ABSTRACT

A device for measuring the mass flow rate, including a flow pipe; a first set of actuators which are arranged in a first plane including a first transverse cross section of the pipe and perpendicular to the fluid flow path, these being configured to move selectively in the first plane; a control circuit configured to control a movement of the first and second actuators so that the cross-sectional area for flow through the pipe in the first plane remains constant; a measurement sensor measuring a force or a stress in a direction perpendicular to the flow path, in the vicinity of the actuators of the (Continued)

first set along the flow path; a computation device configured to calculate the mass flow rate passing through the flow pipe as a function of the force or stress measured by the sensor.

20 Claims, 2 Drawing Sheets

(56) References Cited

U.S. PATENT DOCUMENTS

| | | | |
|---|---|---|---|
| 7,441,469 B2 * | 10/2008 | Shelley | G01F 1/849 |
| | | | 73/861.357 |
| 2006/0000293 A1 | 1/2006 | Rieder et al. | |
| 2006/0173639 A1 | 8/2006 | Carpenter | |
| 2008/0184814 A1 | 8/2008 | Bell et al. | |
| 2008/0252283 A1 | 10/2008 | McAnally et al. | |

FOREIGN PATENT DOCUMENTS

| | | |
|---|---|---|
| JP | 2003-177048 A | 6/2003 |
| WO | WO 2004/011894 A1 | 2/2004 |
| WO | WO 2006/071454 A1 | 7/2006 |
| WO | WO 2007/047524 A2 | 4/2007 |

* cited by examiner

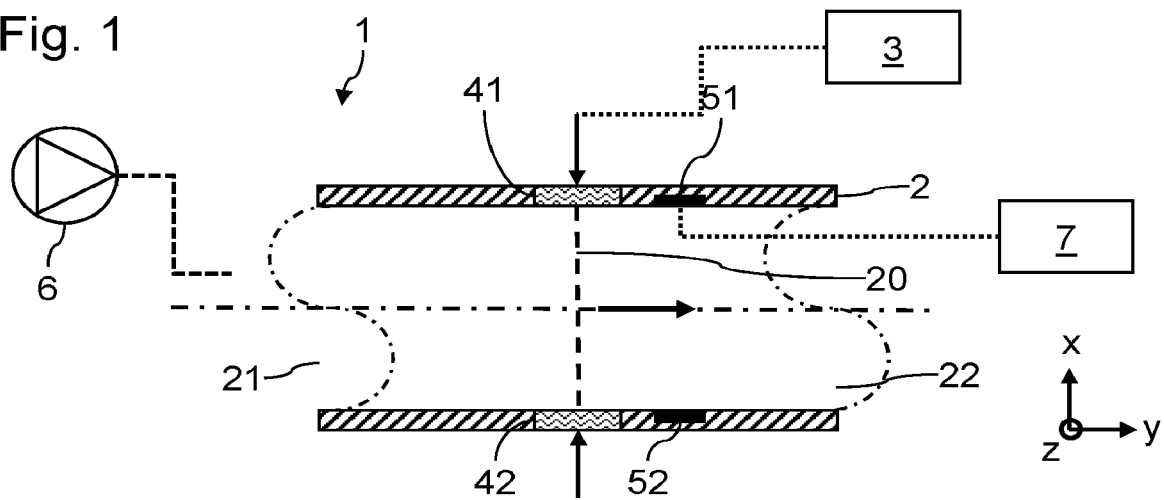
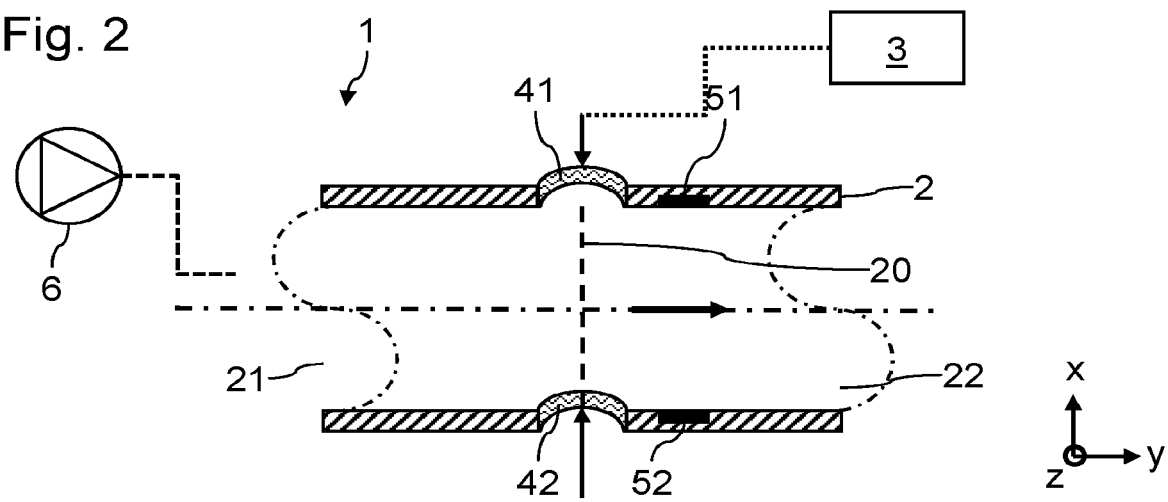
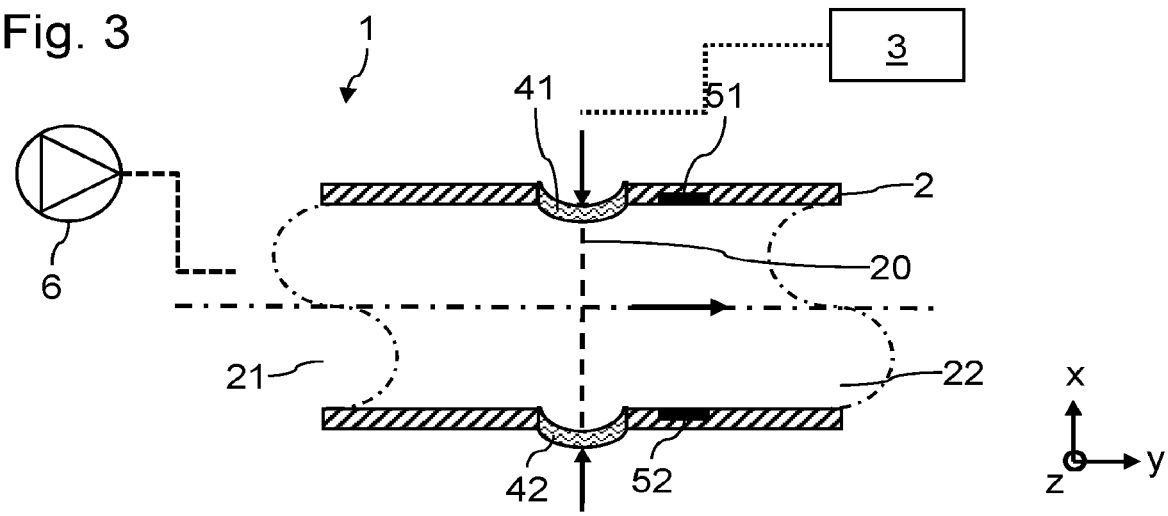

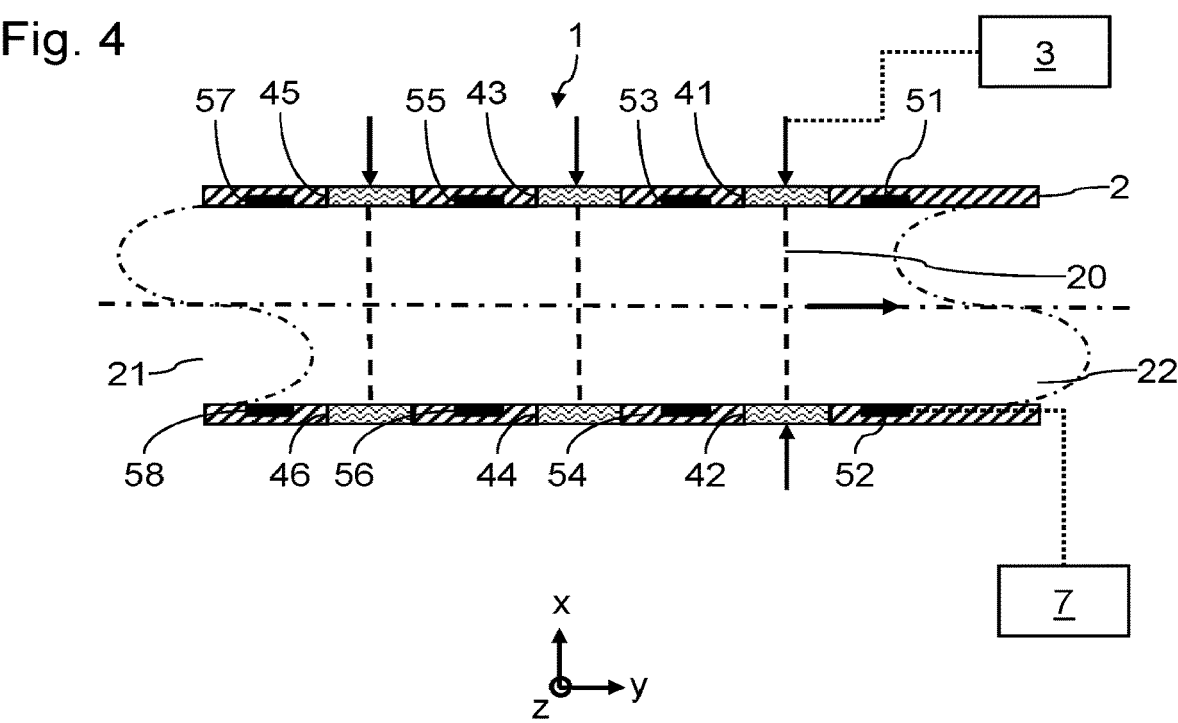

MASS FLOW RATE MEASUREMENT DEVICE

The invention relates to mass-flow-rate sensors, and in particular to mass-flow-rate sensors based on the Coriolis effect.

The measurement of mass flow rate in a tube may prove critical to the operation of certain systems, such as vehicle engines. Specifically, the operation of vehicle engines requires the amount of fuel introduced into a combustion chamber to be known very precisely and in real time, in order to control the operation thereof optimally. In particular, determining the mass flow rate of fuel allows the energy efficiency of the engine to be determined in real time, by comparing the mass flow rate of fuel to the delivered output power, which is measured by other sensors. Notably because of the large temperature variations that the fuel may experience and because of its coefficient of thermal expansion, the volume flow rate of fuel is not a reliable parameter for monitoring the operation of an engine. Specifically, the temperature of the fuel may vary greatly, for example because the variation in temperature in the combustion chamber may propagate to all the components of the surrounding engine, including to a fuel line. Volume flow measurements may thus give a false picture of the actual amount of fuel consumed.

In order to promote a high level of precision and a lower sensitivity to accelerations than with other technologies, Coriolis mass-flow-rate sensors have been developed. Such sensors are based on the Coriolis acceleration that appears when a movement at constant speed with respect to a rotating frame of reference is observed from the exterior.

Document EP2888562 describes a mass-flow-rate sensor that determines a mass flow rate in a tube by measuring vibrational movements of the tube when it is passed through by a fluid. The vibrational modes of the tube are influenced by a combination of its mass, rigidity and structural-damping characteristics. This mass-flow-rate sensor includes actuators configured to excite the tube in the vibrational modes thereof, during a flow of fluid. The actuators are placed at separate locations along the tube. The mass-flow-rate sensor also includes electromechanical transducers that measure a vibrational response of the tube in respective distant locations along the tube.

A mass flow rate in the tube is determined by measuring a time shift or phase shift of the movements measured by the separate transducers. These time or phase shifts are induced by Coriolis forces acting on the flowing fluid. The Coriolis forces are generated by a change in the direction of the flowing fluid, as a result of the vibrations of the tube. These Coriolis forces are applied to the tube forming the sensor and induce disturbances in the vibrational movement. The movement of the tube may then be detected to be in phase advance by one transducer, and in phase delay by another transducer. By determining the phase shift between these transducers, a computer deduces a mass-flow-rate value. Such a computer may for example deduce a time shift from the phase-shift measurement, using the frequency of the vibrational excitation. The mass flow rate flowing through the tube is directly proportional to this time shift.

The tube forming the sensor is held between two stays. The tube is bent at four locations between these stays. An actuator stresses the tube in its middle portion. The transducers are positioned on either side of this actuator.

Such a mass-flow-rate sensor has an insufficient level of precision in environments subject to strong vibrations, such as internal combustion engines, boats or aircraft. Such a sensor may notably prove to be quite sensitive to disturbances in a frequency range extending up to several hundred Hertz, in which range the resonant frequency of the tube is located. The problem is that disturbances in this frequency domain are relatively substantial in certain applications, such as motor vehicles or aeronautics.

Moreover, a Coriolis mass-flow-rate sensor may be produced in a miniaturized version. This downscaling makes it possible to operate at excitation frequencies that are markedly higher than those used in sensors of larger size. Operating at these higher frequencies allows the sensitivity to measurement errors resulting from environmental vibrations to be avoided. In contrast, such a mass-flow-rate sensor is incompatible with the high flow rates required by an internal combustion engine intended for the propulsion of a vehicle, an aircraft or a boat, since the miniaturization leads to a downscaling of the tubes that prevents large flows from passing easily. Furthermore, with such a sensor there is a risk that the tube will become blocked or that its operation will be disrupted by the presence of impurities therein. The absence of impurities may hardly be guaranteed in certain fluid flows.

There is notably a need for a mass-flow-rate sensor that is able to provide a very high level of precision, that is insensitive to vibrations and shocks, and that is able to handle a sufficiently high flow rate of fuel.

The invention aims to overcome one or more of these drawbacks. The invention thus relates to a device for measuring mass flow rate, such as defined in appended claim 1.

The invention also relates to the variants of the dependent claims. Those skilled in the art will understand that each of the features in the description or in a dependent claim may be independently combined with the features of an independent claim without, however, constituting an intermediate generalization.

The invention also relates to a method for measuring mass flow rate, such as defined in the appended claims.

Other features and advantages of the invention will become clearly apparent from the completely non-limiting description thereof that is given below, by way of indication, with reference to the appended drawings, in which:

FIG. 1 is a schematic cross-sectional representation of a device for measuring mass flow rate according to one example of one embodiment of the invention;

FIG. 2 and

FIG. 3 illustrate the device for measuring mass flow rate in two positions of its actuators;

FIG. 4 illustrates one example of another embodiment of the invention at rest.

FIG. 1 is a cross-sectional view of one example of one embodiment of a device 1 for measuring mass flow rate according to the invention. The device 1 includes a flow tube 2. The tube 2 defines a fluid-flow path, illustrated here by the dash-dotted line. The fluid-flow path of the tube 2 will possibly for example be defined by a center line of the tube 2. FIG. 1 illustrates the tube 2 in cross section in a plane including this fluid-flow path. The tube 2 may typically have a circular cross section. In a manner known per se, the tube 2 may be connected to a fluid-driving device, the illustrated pump 6 for example.

The device 1 includes a group of actuators. The group of actuators here includes actuators 41 and 42. The actuators 41 and 42 are placed in the same transverse plane defining a cross section of the tube 2. The transverse plane is thus perpendicular to the fluid-flow path. The actuators 41 and 42 are here placed opposite each other with respect to the fluid-flow path.

The actuators 41 and 42 are controlled to move selectively in the transverse plane. The actuators 41 and 42 are notably configured to modify the shape of the cross section of the tube 2 in the transverse plane. The actuators 41 and 42 are here configured to move selectively so as to protrude or to become recessed with respect to the tube 2 (in other words, to move towards the interior or exterior of the tube in a radial direction, i.e. a direction perpendicular to the axis X). Level with the actuators 41 and 42, the cross section of the tube may be considered to be defined by a surface connecting an outline of the tube 2 downstream of the actuators 41 and 42 to an outline of the tube 2 upstream of the actuators 41 and 42. The movement of the actuators 41 and 42 is controlled by a control circuit 3. The actuators 41 and 42 will possibly for example comprise respective seal-tight membranes and respective piezoelectric elements that stress these seal-tight membranes.

The device 1 furthermore comprises sensors 51 and 52, which are configured to measure a force or a stress in a direction perpendicular to the flow path, i.e. in a radial direction. The sensors 51 and 52 are advantageously of the same number as the actuators 41 and 42. The number of actuators (41 and 42 in the example) of the group of actuators is independent of the number of sensors (51 and 52 in the example) and may therefore be different. The sensors 51 and 52 are placed in proximity to the actuators 41 and 42, respectively. The angular offset of the sensors 51 and 52 about the flow path relative to their respective actuators 41 and 42 is advantageously at most 15° when they are placed in the same plane. The offset of the sensors 51 and 52 with respect to the actuators 41 and 42, respectively, is advantageously at most equal to the distance between the actuators 41 and 42, and preferably at most equal to the radius of the tube 2. The sensors 51 and 52 are positioned in the same plane perpendicular to the flow path of the flow through the tube 2. Sensors 51 and 52 may be positioned opposite each other with respect to the flow path. The sensors 51 and 52 may for example be piezoelectric sensors, or indeed piezoresistive sensors, or else capacitive sensors. Piezoresistive sensors thus are available in nanoscale versions (called NEMS). In each and every case, the sensors could be produced in the form of membranes intended to make contact with the fluid and that couple the forces originating from the latter to the (piezoresistive, piezoelectric or capacitive) measurement structure. In the case of a capacitive measurement of a variation in the position of a mechanical element, the coupling of the latter to a membrane the mechanical properties of which are known allows the stress that was required to cause the measured variation in position to be obtained.

The sensors 51 and 52 are advantageously not fastened to the actuators 41 and 42, so as not to corrupt their measurements. It could also be envisioned to fasten one or more sensors 51 (52, respectively) to the membrane of the actuator 41 (42, respectively).

The control circuit 3 is configured to control the movement of the actuators 41 and 42 so that the area of the cross section 20 of the flow through the tube 2 and through the transverse plane including these actuators 41 and 42 (plane here including the Y and Z directions) remains constant. It is also possible to envision volume being preserved by the movement of the controlled actuators, in a transverse flow segment including these actuators. A description of the movement of the actuators 41 and 42, which movement is illustrated in FIGS. 2 and 3, will allow this to be more readily understood. The control circuit 3 may for example control the actuators 41 and 42 with acceleration setpoints or setpoints for an amount of movement in the transverse plane. Acceleration setpoints notably have the advantage of making the excitation of the fluid independent or almost independent of its density. Two actuators 41 and 42 have been illustrated here for the sake of simplicity. The group of actuators may also include more than two actuators positioned in the same transverse plane, said actuators being controlled to preserve the area of the cross section of the flow in the transverse plane including the actuators 41 and 42. The group of actuators is also configured to modify the shape of the cross section of the tube 2 in the transverse plane.

The control circuit 3 is configured to control the movements of the actuators 41 and 42 at a frequency higher than the main vibration range of the system in which it is to be installed. In particular, for certain applications such as aircraft engines, it is advantageous to actuate the actuators at a frequency at least equal to 20 KHz, and preferably at least equal to 50 KHz. The effect of the excitation of the actuators 41 and 42 on the Coriolis forces is thus hardly affected at all by the vibrations of the system.

Such a movement of the actuators 41 and 42 allows an acceleration to be applied to the fluid that is normal to its flow direction, and characteristic of a rotation. The equations of motion of the fluid seen from a frame of reference at rest outside the tube 2 thus include a Coriolis acceleration term. By reaction of the fluid, the force associated with this Coriolis term induces a force on the tube. The actuators 41 and 42 are thus intended to apply a force not to the complete tube 2 but only to the fluid passing through this tube 2. One of the advantages of this technique is that the measurement of mass flow rate is much more independent of the modulus of elasticity of the tube 2, which may change with the aging of the tube 2. The vibrations of a system may notably induce an alteration of the modulus of elasticity of the tube 2. Moreover, by exciting the fluid rather than tube 2, the service life of the system is increased and the complexity of the specifications as regards the design of tube 2 is limited.

In the configuration illustrated in FIG. 2, the actuator 41 has moved to form a recess with respect to the interior of the tube 2, and the actuator 42 has moved to form a protrusion into the interior of the tube 2. The volume moved by the actuator 41 becoming recessed and the volume moved by the actuator 42 simultaneously protruding are identical, and hence, level with the actuators 41 and 42, the area of the flow cross section of the tube 2 remains constant. In particular, in the transverse plane including the actuators 41 and 42 (plane for example comprising the bow of the movement of the actuators 41 and 42), the area of the flow cross section 20 of the tube 2 remains constant.

Similarly, in the configuration illustrated in FIG. 2, the actuator 42 has moved to form a recess with respect to the interior of the tube 2, and the actuator 41 has moved to form a protrusion into the interior of the tube 2. The volume of the recess formed by the actuator 42 and volume of the simultaneous protrusion formed by the actuator 41 are identical, and hence, level with the actuators 41 and 42, the area of the flow cross section 20 of the tube 2 remains constant. In the transverse plane including the actuators 41 and 42, the flow cross section 20 of the tube 2 here also remains constant.

Advantageously, the protrusions and recesses of the actuators 41 and 42 will respect the following inequality:

$Ac/Aa > 10$, where Ac is the area of the cross section of the flow through the tube 2 level with the actuators 41 and 42, and Aa is the area of the recess and of the protrusion of the actuators 41 and 42 in the flow cross section of the tube 2. Such a ratio notably allows the amplitude of the reaction forces exerted by the fluid on the tube 2 during the movements of the actuators 41 and 42 to be limited.

For actuators 41 and 42 including membranes for moving the fluid, these membranes are for example chosen from materials having the lowest possible plasticity, in order to be robust to aging via effects such as work hardening. Such membranes may for example be made of silicon, SiC, silica in amorphous or crystalline form, silicon nitride, diamond or sintered ceramic.

Advantageously, the tube 2 comprises an inlet orifice 21 and an outlet orifice 22 on either side of the actuators 41 and 42. Between these orifices 21 and 22, the tube 2 advantageously extends along a rectilinear axis. This turns out to be particularly advantageous when the tube 2 has a very small cross section, this limiting the risk of clogging or of disturbance due to impurities level with the actuators 41 and 42. This is particularly advantageous when the area of the flow cross section 20 is smaller than 5 mm², and in particular when this area is smaller than 2 mm². Advantageously, the cross section of the tube 2 between the orifices 21 and 22 has a constant cross-sectional area. The invention is also advantageously applicable to a tube 2 having a flow cross section 20 at least equal to 5 mm², and preferably at least equal to 10 mm². The invention is advantageously applicable to a tube 2 having a fundamental resonant frequency higher than 1 KHz.

The measuring device 1 also includes a computing device 7 configured to compute the mass flow rate passing through the tube 2 depending on a difference between the measurements of the sensors 51 and 52. The computing device 7 may take the form of a commonplace digital computing device capable of executing a computer program for computing mass flow rate depending on the measurements of the sensors 51 and 52.

The computations of mass flow rate by the computing device 7 will for example be based on the following explanations. When a vertical movement v is applied (as illustrated by the motion imposed by the actuators 41 and 42 in FIGS. 2 and 3) to a fluid flowing through the tube 2 with a horizontal speed U (at rest, U=0), a vertical velocity dv/dt is imparted to the fluid, which velocity may be expressed by the following relationship:

$$\frac{dv}{dt} = \frac{\partial v}{\partial x}U + \frac{\partial v}{\partial t} \quad [\text{Math. 2}]$$

This relationship is dependent on the horizontal coordinate x and on time t. The acceleration of the fluid element may then be defined by the following relationship:

$$\frac{d^2v}{dt^2} = \frac{\partial^2 v}{\partial x^2}U^2 + 2\frac{\partial^2 v}{\partial x \partial t}U + \frac{\partial^2 v}{\partial t^2} + \frac{\partial U}{\partial t}\frac{\partial v}{\partial x} \quad [\text{Math. 3}]$$

These four terms respectively correspond to:
the centripetal acceleration:

$$\frac{\partial^2 v}{\partial x^2}U^2 \quad [\text{Math. 4}]$$

the Coriolis acceleration:

$$2\frac{\partial^2 v}{\partial x \partial t}U \quad [\text{Math. 5}]$$

the relative acceleration:

$$\frac{\partial^2 v}{\partial t^2} \quad [\text{Math. 6}]$$

the acceleration related to variations in flow (it will be assumed that the flow rate remains relatively constant with respect to the frequency of the actuators 41 and 42, and that this term is therefore substantially zero):

$$\frac{\partial U}{\partial t}\frac{\partial v}{\partial x}. \quad [\text{Math. 7}]$$

The Coriolis term is proportional to the speed of the fluid. The force that is associated with this acceleration (and that the fluid exerts on tube 2) is defined by:

$$F_c = \frac{2*\partial^2 v}{\partial x \partial t} * Um_F \quad [\text{Math. 8}]$$

where mF is the mass of the fluid. The force, which is proportional to the mass flow rate qm, is thus found to be defined by the following relationship:

$$F_c = 2\frac{\partial^2 v}{\partial x \partial t}q_m \quad [\text{Math. 9}]$$

Thus it is possible to deduce the mass flow rate in the tube by measuring this force, and by isolating it from the forces related to the other terms. To isolate this force, it is enough for the movement to be characterized by a spatial and temporal variation with a known profile (variation applied to the fluid via a coordinated movement of a plurality of actuators for example). This movement is locally for example:

$$v(x,t)=A*\cos(k*x)*\sin(w*t) \quad [\text{Math. 10}]$$

The centripetal term is then $$A*U^2*k^2*\cos(k*x)*\sin(w*t)=U^2*k^2*v(x,t) \quad [\text{Math. 21}]$$

, the Coriolis term $$-A*U*k*\sin(k*x)*\cos(w*t), \quad [\text{Math. 32}]$$

and the relative-acceleration term $$Aw^{e*}\cos(k*x)*\sin(w*t)=w^2v(x,t). \quad [\text{Math. 43}]$$

Thus, the only term temporally in quadrature with the excitation signal is the term that corresponds to the Coriolis force.

The amplitude of this term may be measured using many methods. These methods may all be based on the principle of separation of the quadrature component from the component in phase with the excitation signal. For example:

The force signal may be measured with a synchronous detecting amplifier adjusted to provide measurements in quadrature with the excitation signal (i.e. with a phase shift of 90° thereto). The phase adjustment may be carried out at rest (U=0), when the phase of the forces and the phases of the excitations have a shift of zero.

The phase shift between the signals upstream/downstream of the central point x=0 may be measured, when the spatial profile has even symmetry at a frequency slightly higher or lower than the natural frequency $$\sqrt{k/m}.$$ [Math. 54]

Advantageously signal processing that takes into account all the recorded forces $$F(x_i,t_i)$$ [Math. 65]

(where $x_i$ are the positions in which forces are measured and $t_i$ are the measurement times) and the position setpoints $$v(x,t)$$ [Math. 76]

(or possibly readings of the actual positions reached by the actuators) are employed to determine, via a finite-element model based on the equations given above, the mass flow rate $$q_m=vm_F$$ [Math. 87]

A calibration will be carried out to determine the constant of proportionality between the output of the sensor and the mass flow rate. This constant of proportionality is markedly more stable over time than in the case of prior-art Coriolis mass-flow-rate meters. This precision is notably obtained in the absence of materials that exhibit plasticity: the plasticity of actuator membranes and sensors could induce measurement drift. With the fragile materials (such as silicon, silica, silicon nitride, gallium nitride) used for these components (of lower plasticity than metals), the risk of measurement drift is limited.

FIG. 4 is a cross-sectional view of one example of another embodiment of a device 1 for measuring mass flow rate according to the invention. The device 1 includes a flow tube 2 similar to that described with reference to FIG. 1. The tube 2 defines the fluid-flow path, illustrated here by the dash-dotted line. FIG. 4 illustrates the tube 2 in cross section in a plane including this fluid-flow path.

The device 1 comprises the group including the actuators 41 and 42 and the group including the sensors 51 and 52, such as described with reference to FIG. 1. Furthermore, the device 1 comprises other groups of actuators 43, 44 and 45, 46. The various groups of actuators are offset from one another along the fluid-flow path. Furthermore, the device 1 comprises other groups of sensors 53, 54, and 55, 56, and 57, 58. The various groups of sensors are offset from one another along the fluid-flow path.

For each group of actuators, the latter are placed in the same transverse plane, including a cross section of the tube 2. The actuators of each group are here placed opposite each other with respect to the fluid-flow path. The actuators of a group may be angularly offset with respect to the actuators of another group.

A control circuit 3 is configured to control the movement of the actuators of each group so that the area of the cross section of the flow through the tube 2 and through the plane including the actuators of this group remains constant. The various actuators may be moved with the frequencies described with reference to the embodiment of FIG. 1.

The actuators of the various groups may be controlled to move with different amplitudes. Thus, it is for example possible to define that one group of actuators be positioned at a distance X along the flow path with respect to the midpoint between all the actuators, and a distance L between the most distant actuators. Provision may be made for the amplitude of movement of the actuators at the distance X to be proportional to a given constant multiplied by cos(a*X/L), with a a constant.

The computing device 7 is configured to compute the mass flow rate, via a measurement of differences between the measurements of the sensors of a given group, using a method similar to that described above.

It is also possible to envision coupling the measurements carried out by such a measuring device 1 with measurements carried out with other types of flow-rate probes, such as:
wall stress measurements;
ultrasonic flow meters;
surface-wave flow meters;
optical Doppler-measurement computers.

The invention claimed is:

1. A device for measuring mass flow rate, comprising:
a flow tube defining a fluid-flow path;
a first group of actuators, including at least first and second actuators placed in a first plane including a first cross section of the tube and perpendicular to the fluid-flow path, the actuators of the first group being configured to move selectively in the first plane;
a control circuit configured to control a movement of the first and second actuators of the first group so that the area of the cross section of the flow through the tube in the first plane remains constant, said actuators of the first group being controlled with acceleration setpoints or with setpoints for an amount of movement in the first plane;
at least one sensor for measuring a force or a stress in a direction perpendicular to the flow path, said measuring sensor being placed in proximity to the actuators of the first group on the flow path and furthermore being configured to measure a force in said direction perpendicular to the flow path;
a computing device configured to compute the mass flow rate passing through the flow tube depending on the force or the stress measured by said sensor,
wherein said actuators of the first group are configured to selectively form a recess or protrusion with respect to the tube, said recess and said protrusion having an area Aa in the first plane, the flow area in the tube level with the first plane being denoted by Ac, the following relationship being respected:

Ac/Aa>10.

2. The device for measuring mass flow rate as claimed in claim 1, wherein said mass flow rate is computed using the following relationship, $$F_c = 2\frac{\partial^2 v}{\partial x \partial t}q_m$$ [Math. 98]

with Fc a force measured by the sensor, qm the mass flow rate of fluid passing through the flow tube, v an amplitude of transverse movement of the fluid in the tube, x the longitudinal position of the fluid in the tube, and t time.

3. The device for measuring mass flow rate as claimed in claim 1, wherein the first group of actuators includes at least two actuators positioned in opposite positions on the first cross section.

4. The device for measuring mass flow rate as claimed in claim 1, wherein the area of the cross section of the flow in the first plane is at least equal to 5 mm².

5. The device for measuring mass flow rate as claimed in claim 1, wherein said actuators of the first group are configured to modify the shape of the cross section of the tube in the first plane.

6. The device for measuring mass flow rate as claimed in claim 1, wherein said sensor is a first sensor, the device furthermore comprising a second sensor placed on the side opposite the first sensor with respect to the flow path.

7. The device for measuring mass flow rate as claimed in claim 6, wherein said first and second sensors are placed in the same plane perpendicular to the flow path of the flow through the tube.

8. The device for measuring mass flow rate as claimed in claim 7, wherein the computing device is configured to compute the mass flow rate depending on a difference between the measurements of the first and second sensors.

9. The device for measuring mass flow rate as claimed in claim 6, wherein said computing device is configured to filter the measurements of the first and second sensors to preserve terms in quadrature with the excitation of the actuators of the first group, and configured to subtract these quadrature terms in order to compute the mass flow rate.

10. The device for measuring mass flow rate as claimed in claim 1, wherein the distance between said first and second actuators is larger than the distance between the first actuator and the first sensor.

11. The device for measuring mass flow rate as claimed in claim 1, wherein one of the actuators of the first group comprises a membrane capable of moving so as to become the recess or the protrusion with respect to the tube in the first plane.

12. The device for measuring mass flow rate as claimed in claim 1, furthermore comprising:
a second group of actuators including at least two actuators placed in a second plane including a second cross section of the tube and perpendicular to the fluid-flow path, the second plane being distant from the first along said flow path, each of the actuators of the second group being configured to move selectively in the second plane;
the control circuit being configured to control a movement of the actuators of the second group so that the area of the cross section of the flow through the tube in the second plane remains constant.

13. The device for measuring mass flow rate as claimed in claim 12, wherein said control circuit is configured for a movement of the actuators of the first group at a frequency at least equal to 20 KHz.

14. The device for measuring mass flow rate as claimed in claim 13, wherein said control circuit is configured for a movement of the actuators of the second group at a frequency at least equal to 20 KHz, the frequency of the second group of actuators being different than the frequency of the first group of actuators.

15. The device for measuring mass flow rate as claimed in claim 1, wherein the computing device is configured to filter the measurements of the sensor to preserve terms in quadrature with the excitation of one at least of the actuators of the first group.

16. The device for measuring mass flow rate as claimed in claim 1, wherein the flow tube has a flow direction in normal operation, and wherein said sensor is placed downstream, in said flow direction, with respect to the actuators of the first group of actuators.

17. The device for measuring mass flow rate as claimed in claim 1, wherein the first and second actuators include membranes made of silicon, SiC, silica in amorphous or crystalline form, silicon nitride, diamond or sintered ceramic.

18. The device for measuring mass flow rate as claimed in claim 1, wherein the first and second actuators include seal-tight membranes and piezoelectric elements that stress the seal-tight membranes.

19. The device for measuring mass flow rate as claimed in claim 1, wherein the sensor is a piezoelectric sensor or a capacitive sensor.

20. A method for measuring mass flow rate, in a device comprising:
a flow tube defining a fluid-flow path;
a first group of actuators, including at least two actuators placed in a first plane including a first cross section of the tube and perpendicular to the fluid-flow path, the actuators of the first group being configured to move selectively in the first plane;
at least one sensor for measuring a force or a stress in a direction perpendicular to the flow path, said measuring sensor being placed in proximity to the actuators of the first group on the flow path and furthermore being configured to measure a force in said direction perpendicular to the flow path;
the measuring method comprising:
controlling a movement of the first and second actuators of the first group so that the area of the cross section of the flow through the tube in the first plane remains constant, said actuators of the first group being controlled with acceleration setpoints or with setpoints for an amount of movement in the first plane;
computing the mass flow rate passing through the flow tube depending on the force or the stress measured by said sensor,
wherein the movement of the first and second actuators of the first group are controlled to selectively form a recess or protrusion with respect to the tube, said recess and said protrusion having an area Aa in the first plane, the flow area in the tube level with the first plane being denoted by Ac, the following relationship being respected:

$Ac/Aa > 10$.

* * * * *